United States Patent
Fernandez, Jr. et al.

(10) Patent No.: US 10,292,403 B2
(45) Date of Patent: May 21, 2019

(54) MULTIPLE STACKED ROTATABLE LOLLIPOP

(71) Applicants: Rodolfo Fernandez, Jr., Kings Mountain, NC (US); Osvaldo Diaz, Orlando, FL (US); Rodolfo Fernandez, Sr., Kings Mountain, NC (US)

(72) Inventors: Rodolfo Fernandez, Jr., Kings Mountain, NC (US); Osvaldo Diaz, Orlando, FL (US); Rodolfo Fernandez, Sr., Kings Mountain, NC (US)

( * ) Notice: Subject to any disclaimer, the term of this patent is extended or adjusted under 35 U.S.C. 154(b) by 292 days.

(21) Appl. No.: 15/169,785

(22) Filed: Jun. 1, 2016

(65) Prior Publication Data
US 2017/0000160 A1    Jan. 5, 2017

Related U.S. Application Data

(60) Provisional application No. 62/187,358, filed on Jul. 1, 2015.

(51) Int. Cl.
  *A23G 3/54* (2006.01)
  *A23G 3/42* (2006.01)
  *A23G 3/56* (2006.01)

(52) U.S. Cl.
  CPC .................. *A23G 3/563* (2013.01)

(58) Field of Classification Search
  CPC ........ A23V 2200/09; A63H 3/48; A63H 1/00; A63H 1/18; A23G 3/563; A23G 3/56;
  (Continued)

(56) References Cited

U.S. PATENT DOCUMENTS 1,652,789 A * 12/1927 Moore .................. A23G 9/506
                                                            426/134
1,847,415 A *  3/1932 Snell ...................... A23G 3/563
                                                            294/5.5
(Continued)

FOREIGN PATENT DOCUMENTS

DE         711896 C   * 10/1941   ............. A23G 9/503
NL        2002554 C   *  8/2010   ............. A23G 3/563
(Continued)

OTHER PUBLICATIONS

DE 711896 C Espacenet Translation.*

*Primary Examiner* — Erik Kashnikow
*Assistant Examiner* — Ashley Axtell

(57) ABSTRACT

Multiple Stacked Rotatable Lollipop comprising at least two stacked individual components each with a plurality of flavors, colors and shapes, each provided with tubular holding sticks, except the uppermost component which has a solid holding stick, while the upper open ends of the tubular holding sticks of the lower and intermediate components are accessible at the top of their candies or edible parts, and each tubular stick is conveniently dimensioned to loosely insert the holding stick of the individual component stacked above, each longer than the immediate holding stick below, so the lower end of each holding stick protrudes out in a telescopic fashion, thereby when the user holds the stick of one of the stacked components with one of his/her hands, can rotate for his/her amusement any of the other components with the other hand or with his/her tongue directly driving its corresponding edible part.

10 Claims, 5 Drawing Sheets

(58) Field of Classification Search
CPC ........ A23G 3/566; A23G 4/186; A23G 4/184;
A23G 1/505; A23G 9/503; A23G 2200/12
USPC ..... 446/73, 69, 266, 236, 386, 238, 257, 82,
446/83; 426/90, 91, 104, 134; D1/101,
D1/102, 103, 105
See application file for complete search history.

(56) References Cited

U.S. PATENT DOCUMENTS

| | | | | |
|---|---|---|---|---|
| 1,939,450 | A * | 12/1933 | Horton | A23G 9/50 426/139 |
| 2,162,224 | A * | 6/1939 | Legge | A23G 9/00 220/737 |
| 2,766,123 | A * | 10/1956 | Moubayed | A23G 9/44 426/132 |
| 2,799,587 | A * | 7/1957 | Schwartz | A23G 3/50 426/104 |
| 3,140,954 | A | 7/1964 | Schroeder | |
| 3,290,157 | A * | 12/1966 | Schwartz | A23G 3/50 264/318 |
| 3,545,980 | A * | 12/1970 | Stanger | A47G 21/183 426/134 |
| D246,207 | S | 11/1977 | Dee | |
| 5,324,527 | A | 6/1994 | Coleman | |
| 5,458,277 | A * | 10/1995 | Wyzykowski | A23G 3/50 220/4.24 |
| 5,690,535 | A | 11/1997 | Coleman et al. | |
| 5,702,742 | A * | 12/1997 | Jones | B65D 43/0212 426/106 |
| 5,740,912 | A * | 4/1998 | Chen | B65D 85/60 206/457 |
| 5,906,846 | A * | 5/1999 | Coleman | A23G 3/563 426/104 |
| 5,955,099 | A * | 9/1999 | White | A23G 3/563 220/4.22 |
| 5,957,746 | A * | 9/1999 | Diamond | A23G 3/50 446/236 |
| 5,976,590 | A * | 11/1999 | Coleman | A23G 3/50 426/134 |
| 6,074,266 | A * | 6/2000 | Zak | A23G 3/50 446/236 |
| 6,221,409 | B1 | 4/2001 | Bueno-Cerezuela | |
| D468,513 | S | 1/2003 | Wolfe et al. | |
| 6,565,899 | B1 * | 5/2003 | Cecere | A23G 3/50 426/132 |
| 6,645,030 | B2 | 11/2003 | Coleman et al. | |
| D491,336 | S * | 6/2004 | Cecere | D1/102 |
| 6,932,978 | B2 * | 8/2005 | Huntley | A61K 9/0056 424/422 |
| D536,966 | S * | 2/2007 | Cecere | D9/436 |
| 7,211,282 | B2 | 5/2007 | Straus et al. | |
| 7,214,397 | B1 * | 5/2007 | Renna | A23G 3/563 426/104 |
| 8,376,246 | B2 * | 2/2013 | White | A47G 21/182 239/16 |
| 8,734,876 | B2 | 5/2014 | French | |
| 8,951,588 | B2 | 2/2015 | Block et al. | |
| 2002/0102903 | A1 * | 8/2002 | Coleman | A23G 3/28 446/71 |
| 2003/0012854 | A1 * | 1/2003 | Bacanskas | A23G 3/346 426/134 |
| 2003/0068412 | A1 | 4/2003 | Coleman et al. | |
| 2004/0046042 | A1 * | 3/2004 | Judd | A47G 21/183 239/33 |
| 2004/0156955 | A1 | 8/2004 | Klima | |
| 2005/0031746 | A1 | 2/2005 | Johnson | |
| 2005/0095949 | A1 * | 5/2005 | Fernandez, Jr. | A63H 33/108 446/236 |
| 2006/0040019 | A1 * | 2/2006 | Cecere | A23G 3/563 426/85 |
| 2008/0233247 | A1 * | 9/2008 | Fernandez | A23G 3/54 426/134 |
| 2008/0305218 | A1 * | 12/2008 | Kahn | A23G 9/24 426/91 |
| 2009/0286448 | A1 * | 11/2009 | Lopez | A23G 3/563 446/71 |
| 2012/0213894 | A1 * | 8/2012 | Block | A23G 3/563 426/104 |

FOREIGN PATENT DOCUMENTS

| | | | | |
|---|---|---|---|---|
| WO | WO-0044647 | A1 * | 8/2000 | ............... A23G 3/50 |
| WO | WO-2014072558 | A1 * | 5/2014 | ............... A23G 3/56 |

* cited by examiner

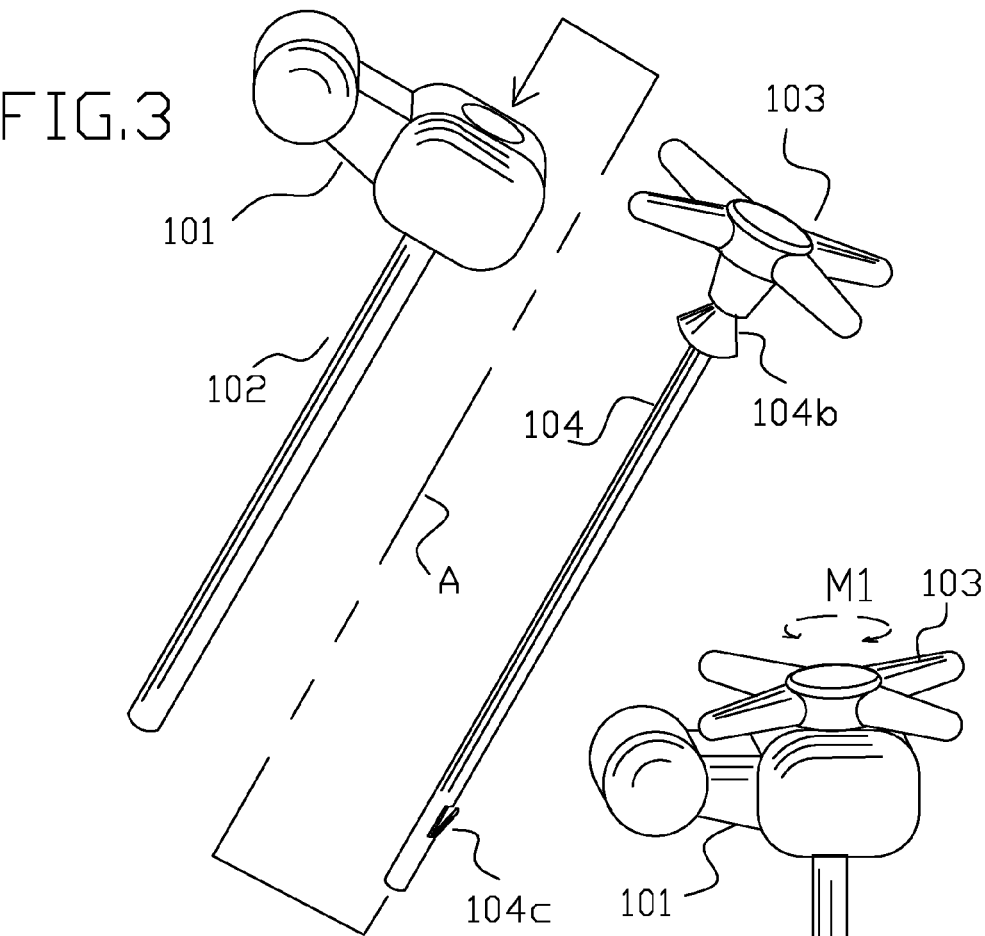
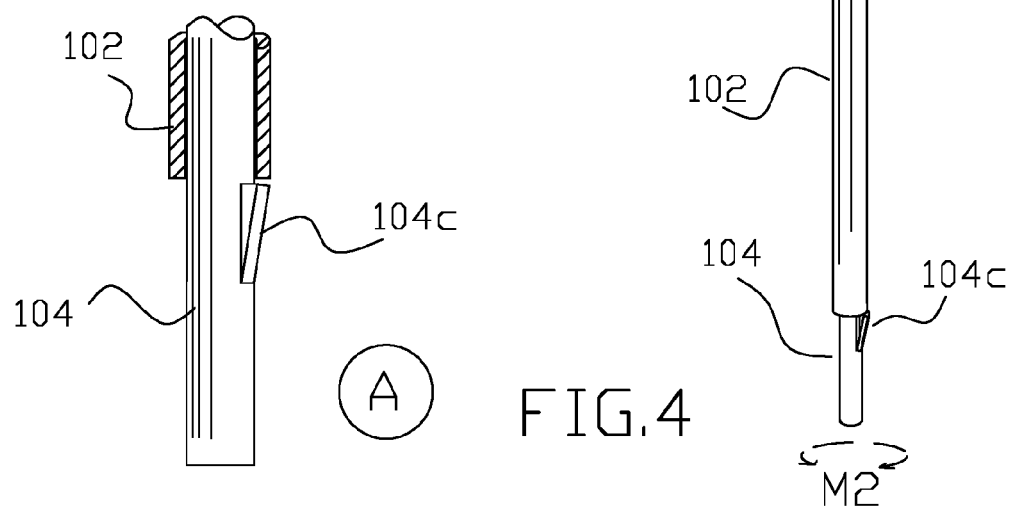
FIG.3
FIG.4

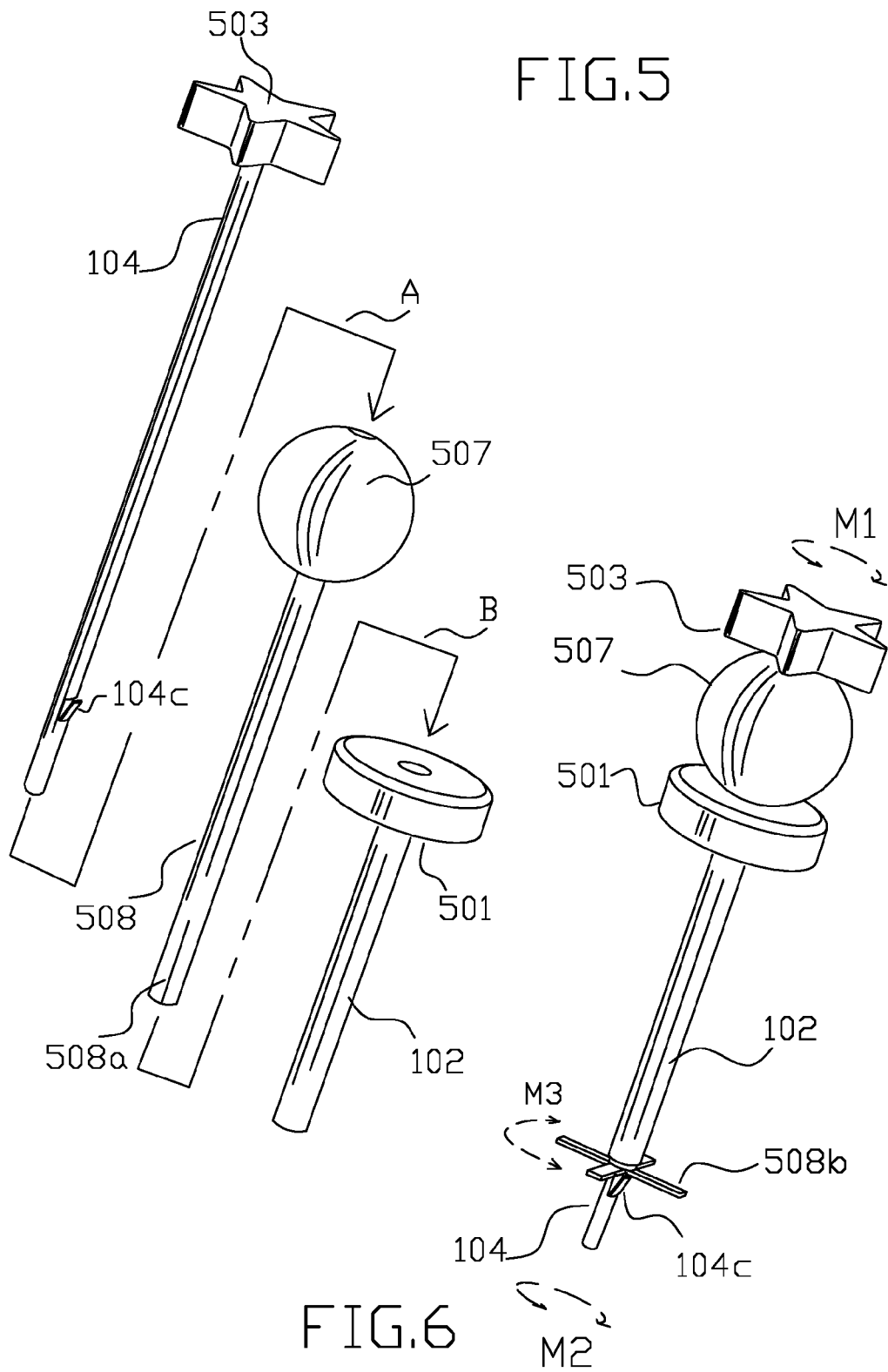

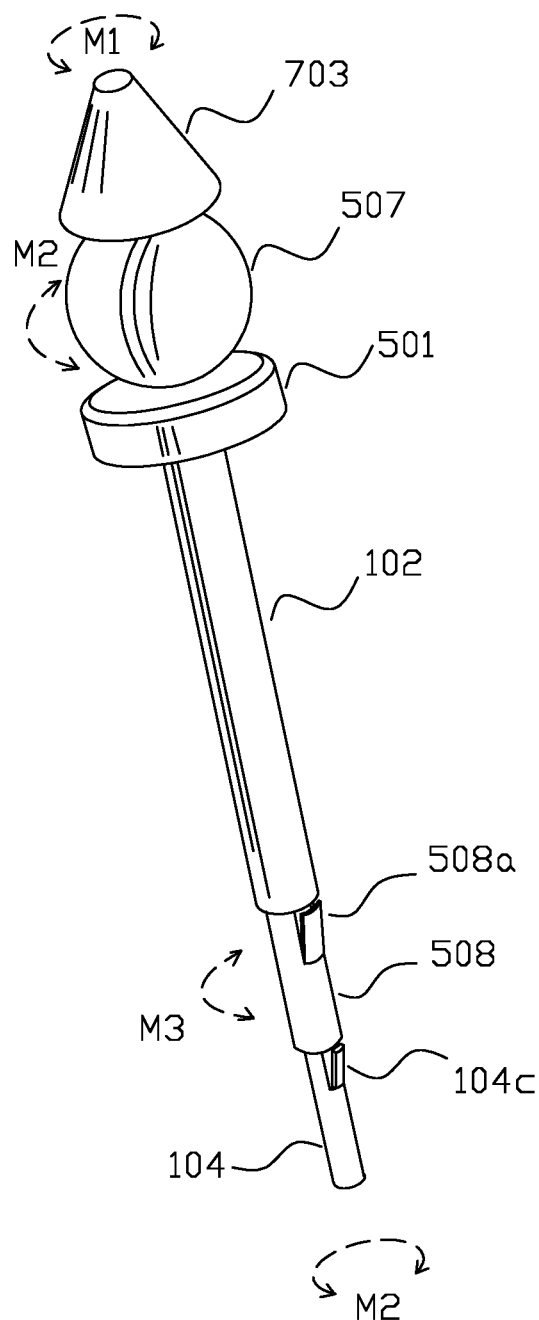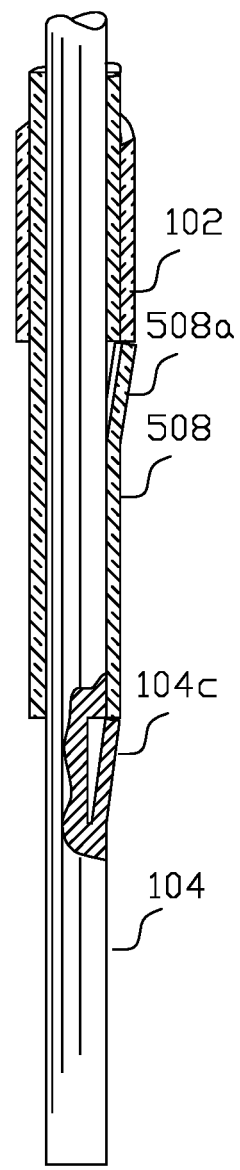
FIG.7
FIG.8

MULTIPLE STACKED ROTATABLE LOLLIPOP

CROSS REFERENCE TO RELATED APPLICATIONS (Not Applicable)

STATEMENT REGARDING FED. SPONSORED R & D (Not Applicable)

REFERENCE TO SEQUENCE LISTING (Not Applicable)

BACKGROUND OF THE INVENTION

This invention relates to confectioneries in general, and particularly to lollipops, combining two or more individual edible parts each molded on a holding stick like lollipop confectioneries, but especially configured to be assembled stacking together one above the other, in order to integrate one multiple lollipop, with a plurality of shapes, colors and flavors, which allows the user to manually rotate each of the stacked components independently.

Due to its advantages and popularity, many different inventions and innovations have been developed regarding this type of confectionery.

The lollipop consumption has been growing year after year, and at the same time, their fields of use have been diversified, including pharmaceutical products and other edible confectioneries and toys.

Despite the numerous innovations and devices related to lollipops that have been created, one characteristic has remained unchanged in all of them: the tight attachment of a candy or edible part at one end of a usually disposable holding stick.

Therefore, users have enjoyed sucking, licking or biting the candy or edible part rigidly attached to a stick. That arrangement provides several advantages as, for example, when the user wants to speak or drink some beverage, he/she may easily take out the candy or edible part from his/her mouth and hold it safely and hygienically in the meantime; that can be done with no need to touch the candy or edible part directly with his/her hands, but with the limitations imposed by its rigid connection to a holding element and usually comprising only one candy or edible part.

Consequently, many patents have been issued for improvements and novelties, and a great variety of designs has been introduced in the field of lollipops, regarding their shapes, sizes, color, flavor and combinations of colors and flavors, including a large number of lollipop holders with multiple supplementary features and diverse complexity.

However, according to our search, most patents have been always related to single lollipops with one candy or edible part in a fixed position and a solid holding stick or stem, while just a few of them have been provided with hollow or tubular holding sticks like those used in the present invention.

Certainly, when the user is sucking a simple conventional lollipop, if the holding stick is tubular like a drinking straw, the suction action of the candy or edible part can be negatively affected by the air that can enter through the hollow core of the holding stick, but that can be overcome closing the top of the stick with the tongue while sucking or slightly tilting the lollipop and closing the open end with the lips.

In the present invention, in addition, said inconvenience mentioned above is mostly minimized by the presence of the solid stick of the uppermost stacked candy or edible part.

For massive highly automatic production the use of tubular holding sticks can require some changes to the manufacturing process currently used, where the holding sticks are inserted into the candies or edible parts after they are molded while their mass is still hot and semi fluid.

There are dozens of thousands of commercially available novelties in this field, including all kind of combinations of shapes, sizes, flavors and colors and hundreds of holders, dispensers and containers, many of them with interesting amusing features including light, sound and motion.

Thereof many prior patented inventions related to relatively complex holding devices, that impart rotation and other motions to individual conventional lollipops, as well as provide them with sound, illumination effects and other amusing features, but there are no prior inventions related to confectioneries in general and lollipops in particular that provide the combination of two or more individual components allowing each or them to be manually rotated by the user independently without the use of additional holders which are reusable, and relative complex and expensive.

Among the U.S. invention patents and designs cited for reference in its entirety there are some holding devices directly related to rotate or impart rotation to individual conventional lollipops; others incorporating two or more flavored edible parts and still others incorporating tubular holding sticks for other purposes, like combining a lollipop with a drinking straw.

For example, U.S. Pat. No. 6,565,899 B1 was granted to Cecere in May 2003 for a Combination Lollipop, Drinking Straw and Beverage Cap, which teaches a simple individual candy affixed around the upper portion of a tubular holding stick leaving exposed its open top.

Said prior art invention includes the use of a tubular drinking straw-like holding stick, with its top open end exposed on top of the edible part of a lollipop with the purpose of being used as a drinking straw, but that is its only similarity with the present invention.

The only prior art inventions that somehow teach lollipop rotation are not actually lollipops, but handles or holding devices to which conventional lollipops are attached and therefore are not directly related to the present invention whatsoever.

Among those devices the U.S. Pat. No. 8,951,588 B2 was issued in February 2015 to Block, with the title "Device and Method for Rotation of Confectionery", consisting a reusable hand held device onto which are engaged candies or edible parts especially configured, provided with a centrally located and conveniently dimensioned hole, in a manner that allows said engaged confectioneries to spin freely, driven by the user directly with his/her tongue.

Said prior art invention refers to a holding device and is not really a novelty lollipop, and some differences in relation to the present invention are that: the holding component is a reusable and more complex device; the edible parts of the invention are especially manufactured and supplied as separate components and the spinning is driven only by the user's tongue or optionally by means of an electric motor or winding mechanism.

Among others, one important disadvantage in relation to the present invention is that the use of said prior art invention involves hygienic and health concerns, because being reusable, the holding device requires thorough and careful washing and storage and to use it, it is necessary to use the hands to handle the candies of edible parts in order to assemble them onto the holding device.

Other relative disadvantage of said prior art invention is that it can comprise several small separate non-edible elements that might accidentally get loose, involving the risk of unsafe use by little children.

A limitation of said prior art invention is that the shape of the confectioneries has to be substantially planar due to practical requirements regarding its assembling and performance.

Another prior art found that refers to a device for the manual rotation of a lollipop was published with the reference number 2004/0156955 A1, filed on February 2003 by Klima, with the title "Candy Sucker".

Said prior art publication is not really a candy sucker as its title suggests, it is actually a device as mentioned in its claims, very simple though, comprising a case with a tubular handle to store the edible part of one lollipop, and providing a holding stick with a little knob to impart rotation manually to the lollipop that is inserted onto the top of the device.

Although its rotation feature is similar to the manual rotation of the present invention, it is not a confectionery or combination of confectioneries, but as said above: a non-edible mechanical device.

One limitation of said mechanical device is that it only works with one lollipop. Furthermore, when reused, it also has the hygienic problems associated with that condition regarding its washing and storage care.

Commercially available there is a plastic holder provided with gears and a tiny handle with which the user can impart rotation to a lollipop inserted on its top, the Creamy Krank Lollipop distributed by "The Nutty Fruit House".

Said novelty is not just a confectionery, but like in the previous cases, it is a reusable non-edible holding device that works with one simple lollipop and as such has the corresponding hygienic disadvantages mentioned above, being in addition relatively complex and expensive in comparison with the present invention.

Furthermore, a common relative disadvantage inherent to all lollipop holding devices is that their production involves manufacturing processes that are substantially different to those used for confectioneries in general and lollipops in particular, creating additional unnecessary complications, while the present novelty invention only requires the usual manufacturing processes typical of the confectionery manufacturing industry.

According to our search, so far no invention or design has been submitted claiming the specific features of the Multiple Stacked Rotatable Lollipop object of the present invention, directly related to confectioneries and not including reusable holding devices.

The novelty of the present invention should be understood as being distinguished from those prior art references and such incorporation by reference is only provided for enabling support of the numerous ways in which this particular product can be manufactured.

BRIEF SUMMARY OF THE INVENTION

It is the object of the present invention to provide lollipops users with a new and different kind of lollipop, combining at least two individual edible parts each provided with its own holding stick like current lollipop confectioneries, but stacked one above the other and especially configured to allow the user to rotate each stacked component independently either with his/her hands or with his/her tongue.

The Multiple Stacked Rotatable Lollipop object of the present invention differs from all the prior art lollipops in that the holding sticks of the individual stacked components are hollow or tubular, except that of the uppermost one which is solid like in conventional lollipops, and each holding stick is coaxially inserted into the next below in a telescopic fashion with a substantially loose fit.

The inner diameter of each tubular holding stick of the stacked components is slightly larger than the outer diameter of the immediate upper one; the upper opening of each tubular holding stick, not the solid one of the uppermost individual component, is visible and accessible on top of its corresponding candy or edible part, and is longer than the immediate lower holding stick, sufficient for its lower end to protrude out of the lower end of the immediate tubular holding stick below, providing a substantially long exposed lower portion for each inserted holding stick.

Therefore, in the present invention the user has the option to make each of the stacked individual components rotate in relation to the others, either driving the protruding lower portion of its corresponding holding stick with his/her fingers or by driving any of the stacked individual edible parts directly with his/her tongue which is another feature of this innovative combined form of confectionery.

One advantage of the Multiple Stacked Rotatable Lollipop is that to enjoy its extra amusing feature of rotation, the multiple stacked components are easily rotated without the need for the user to touch any of them directly with his/her hands and fingers, thereby providing a hygienic and healthy way to use it without relative complex and expensive reusable holding devices.

Other important advantage of the present invention is that it does not comprise any independent small component, providing a safe use for little children.

Another advantage of the present invention is that the stacked edible parts can have a plurality of different shapes, colors and flavors, improving the user's amusement, watching the colored components rotating, or sensing their movement inside the mouth, and enjoying the diverse flavors, especially in the case of toddlers and little children.

In order to facilitate the rotation of the upper individual lollipops, the protruding lower ends of their sticks can be especially shaped, for the user, who often are little children, to hold the outer tubular holding stick of the lowermost lollipop with one hand and at the same time to impart rotation to the upper and intermediate individual stacked components with the fingers of the other hand.

As another convenient feature, the protruding lower end of the holding stick of each component remain securely assembled by means of integrated retaining elements, and the protruding lower end of each holding stick can be properly conformed to perform as miniature crank or knob, making easier for the user to have fun rotating any of the integrating components in relation to the others.

As said above in the background of the invention, the use of tubular holding stick like a drinking straw, in a certain way affects the suction action of the candy or edible part because of the air that can enter through it, but that can be overcome closing the top of the stick with the tongue while sucking or slightly tilting the lollipop and closing the open end with the lips, as well as it is limited by the presence of the solid stick of the uppermost stacked candy or edible part.

It was also mentioned above in the background of the invention that in current massive production of conventional lollipops the holding sticks are inserted into the candies or edible parts after they are molded while their mass is still hot and fluid, therefore to prevent the obstruction of the tubular holding sticks used in some of the individual components of the present invention it would be necessary the introduction of some changes in the automatic manufacturing process.

Many optional modifications could be used for the massive production of the present invention using tubular sticks. One could be, for example, to make said tubular sticks in a manner that their top end tips are closed and inserted further to protrude sufficiently out of the candies or edible parts, and then adding an operation to cut off the protruding closed end tips of said sticks.

However, for small scale production, it is very easy to use multiple molds where the tubular holding sticks are all pre-assembled together in a telescopic fashion and placed in position prior to the forming of the candies or edible parts, pouring or injecting the molten candies or edible parts, either simultaneously or one at time into each of the multiple cavities.

The feasibility and performance of the invention were fully verified and tested by the authors with a home made prototype comprising two individual components, using hand made crafted simple molds, wherein the holding sticks were placed in position prior to the pouring of the molten candy, being used a shortened drinking straw for the lower component and a beverage stirrer for the upper one.

Those mentioned features and advantages, and some others, will become evident to those skilled in the art through the drawings and their descriptions illustrating the present invention, which constitutes a novel kind of combined lollipop.

It is to be understood that this invention is not limited in its application to the details of construction and to the arrangement of the components in the following description or as illustrated in the drawings.

The invention herein described is feasible with other embodiments and of being practiced and carried out in various ways which will be obvious to those skilled in the art. Also it is to be understood that the phraseology and terminology employed herein are for the purpose of description and should no be regarded as limiting.

As such, those skilled in the art will appreciate that the conception upon which this disclosure is based may readily be utilized as a basis for the design of other structures, methods and systems for carrying out the several purposes of the present disclosed device.

It is important, therefore, that the claims be regarded as including such equivalent construction and methodology insofar as they do not depart from the spirit and scope of the present invention.

BRIEF DESCRIPTION OF THE DRAWINGS

FIG. 3 is an isometric exploded view of a similar embodiment of FIG. 1, with the solid holding stick provided with a retaining flap.

FIG. 4 is an isometric side view of the same embodiment of FIG. 3 assembled.

FIG. 5 is an isometric exploded view of the components of another possible preferred embodiment of the invention comprising three stacked components.

FIG. 6 is an isometric side view of the same embodiment of FIG. 5 assembled.

FIG. 7 is an isometric view of another possible preferred embodiment of the invention comprising three stacked components.

FIG. 8 is a partial magnified detail showing an axial section of the assembled lowest portions of the holding sticks of the three stacked components of the same embodiment of FIG. 7.

DETAILED DESCRIPTION OF THE INVENTION

Figure 1:
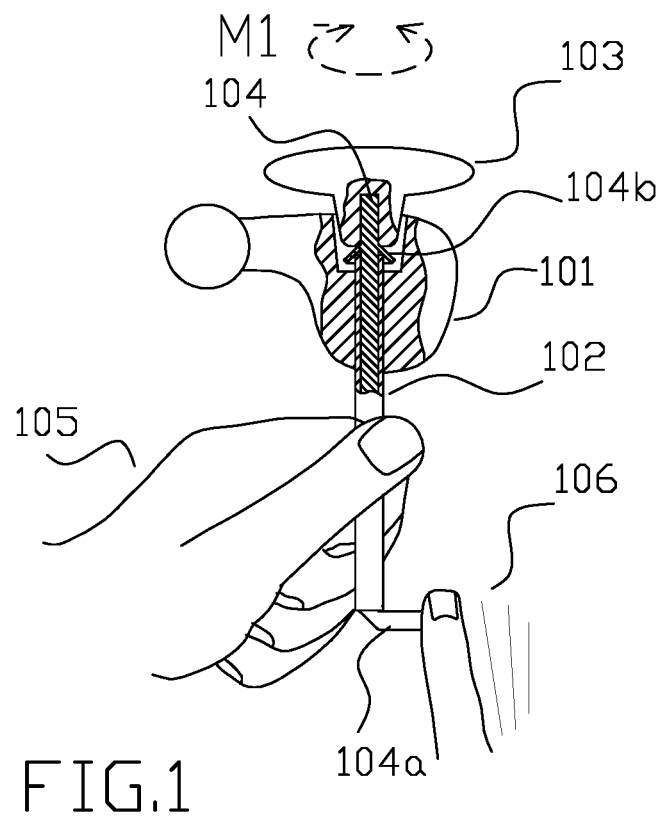
FIG. 1 is an isometric side view of a preferred embodiment of the Multiple Stacked Rotatable Lollipop comprising two stacked components, being held by a user's hand.

This Multiple Stacked Rotatable Lollipop comprises at least two stacked individual component, but can comprise as many components as desired, within practical limits.

The holding stick of the lowermost individual stacked component integrating the Multiple Stacked Rotatable Lollipop is hollow or tubular and goes all the way through from the bottom to the top of the candy or edible part that is molded and affixed around the upper end portion of said tubular holding stick, leaving the open upper end of said tubular holding stick visible and accessible from the top of said candy or edible part, and being the internal diameter of said tubular holding stick big enough to introduce the holding stick of another individual component with a loose fit in a telescopic fashion.

The holding stick of the uppermost, the top one, of the individual stacked component integrating the Multiple Stacked Rotatable Lollipop, is solid as in conventional lollipops and its candy or edible part is molded and affixed covering the top end of said solid holding stick as in prior art lollipops.

When the Multiple Stacked Rotatable Lollipop comprises three or more individual components, each of the holding sticks of those intermediate ones, between the lowest and the top stacked components, must also be hollow or tubular and going all the way through the corresponding candy or edible part, which must also be molded around the upper end portion of said tubular holding stick, with the open top of said upper end exposed above the top of said candy or edible part as in the lowermost component, and the internal diameters of each intermediate tubular holding stick must be properly dimensioned to provide a loose fit for the holding stick of the next upper stacked component.

The lower end of the holding stick of each individual lollipop integrating the Multiple Stacked Rotatable Lollipop must be longer than the immediate lower one; it can be provided with a retaining element to prevent the accidental disassembling of the Multiple Stacked Rotatable Lollipop, and must protrude out sufficiently to provide a means for improving the user's fun, rotating at will with his/her hands and fingers any of the upper individual stacked components.

However, if retaining elements are not provided or can be reversed, the user can disassemble the Multiple Stacked Rotatable Lollipop at will to consume each of the assembled component separated as conventional individual lollipops.

All components of the present invention, in all their possible variations, can be produced using common reliable manufacturing processes, often automatic with high rates of production and highly efficient, which are very well known in the field of confectionery production.

The hollow or tubular holding sticks, for example, are very similar to the drinking straws commercially manufactured.

In the following figures, the position of the same or equivalent component or parts of components are designated with the same final digits, according to their function rather than to its configuration, since there are an infinite variety of different possible shapes for the same components, while the first digit to the left corresponds to the figure in which the specific element is depicted for the first time.

Most main features of the Multiple Stacked Rotatable Lollipop are explained below in the detailed description of the illustrative figures; however, as it is obvious, the embodiments of the components of the present invention may be much more diversified than those illustrated.

The FIG. 1 depicts an elevation view of a preferred embodiment of the invention with two stacked components held by the user in one hand 105 sustaining the lower candy or edible part 101 by its tubular holding stick 102, while a finger 106 of the other hand imparts rotation as indicated by the arrow curved line M1 to the upper candy or edible part 103 by means of its solid holding stick 104, which, after its insertion into the tubular holding stick 102, has its protruding lower end bent, forming a sort of tiny lever 104a.

This view is partially sectioned to illustrate how the solid holding stick 104 is securely embedded into the upper candy or edible part 103 and how it is inserted into the tubular holding stick 102 of the lower candy or edible part 101, which is molded affixed around the upper portion of said tubular holding stick 102.

In this embodiment of the invention said tiny lever 104a, not only provides the user an easier way to rotate said candy or edible part 103, but at the same time prevents the Multiple Stacked Rotatable Lollipop from disassembling.

Additionally, as illustrated, the solid holding stick 104 is provided with an integrated umbrella like tiny cone 104b covering the upper open end of the tubular holding stick 102, with the purpose to prevent that, when the user is licking and sucking the lower candy or edible part 101, the resulting dissolved viscous fluid substance leaks down through the tubular holding stick 102 after the upper stacked candy or edible part 103 has been totally consumed.

That little cone 104b is optional, because the viscosity of the dissolved candy or edible part practically prevents it from leaking down through the relatively narrow gap between the holding sticks.

In this preferred embodiment of the invention, the lower candy or edible part 101 has its top depressed in a manner that the upper end of its tubular holding stick 102 is visible and accessible, but does not protrude out beyond the top of the candy or edible part 101, in order to facilitate the user to consume said candy or edible part 101 after the upper candy or edible part 103 has been totally consumed, without removing its corresponding solid holding stick 104 which, in turn, only protrudes out on top just a little bit.

Figure 2:
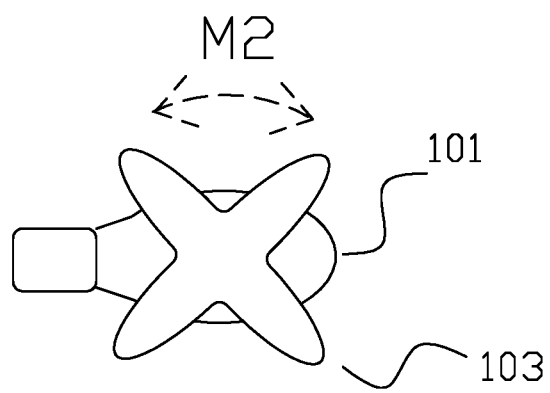
FIG. 2 is a top view of the same embodiment of FIG. 1.

In FIG. 2 is depicted the top view of the same embodiment of the invention depicted in FIG. 1, and in said view can be seen the shape of the upper candy or edible part 103, that in this case resembles in stylized form the propeller of a miniature helicopter which is in turn resembled by the lower candy or edible part below 101 and can be rotated as indicated by the arrow curved line M2.

In this preferred embodiment of the invention the holding sticks 102 and 104 cannot be easily disassembled after the candies or edible parts 101 and 103 have been consumed, but when only the upper candy or edible part 103 is totally consumed, its holding stick 104 only protrudes out on top of the lower candy or edible part 101 just a little bit, in a manner that allows the user to lick and suck easily the remaining candy or edible part 101.

The FIG. 3 is an exploded view of an embodiment similar but not identical to that previously depicted in FIG. 1, illustrating a possible way of assembling in a telescopic fashion the Multiple Stacked Rotatable Lollipop, as indicated by the assembling line A, in this case after having molded both candies or edible parts 101 and 103, of the lower and upper component respectively, onto their corresponding holding sticks 102 and 104.

As in FIG. 1, the holding stick 104 is provided with the optional tiny inverted cone umbrella like 104b, but in addition it is provided with a little retaining flap 104c near its lower end.

The FIG. 4 is an elevation isometric view of the embodiment of the same embodiment of invention previously depicted in FIG. 3, with the lower candy or edible part 101 and its tubular holding stick 102, and the upper candy or edible part 103 stacked on top, with a portion of the lower end of its solid holding stick 104 visible protruding from the lower end of the tubular holding stick 102, and with the tiny retaining flap 104c, which collapses for the assembling and then flips out in position preventing the Multiple Stacked Rotatable Lollipop from disassembling.

In FIG. 4 is also shown the detail A, which is a magnified partial axial section of the lower portions of both holding sticks 102 and 104 showing the retaining flap 104c expanded after the assembly.

A substantial portion of the lower end of said solid holding stick 104 protrudes from the lower end of the outer tubular holding stick 102 and performs as a simple means for the user to rotate the upper candy or edible part 103, as indicated by the arrow curved lines M1 and M2, for his/her amusement.

In order to facilitate the assembling in a telescopic fashion and to provide a fit loose enough for the solid holding stick 104 of the upper candy or edible part 103 to freely rotate in relation to the lower candy or edible part 101, the inner diameter of the tubular holding stick 102 of said lower candy or edible part 101, is slightly larger than the outer diameter of the solid holding stick 104 of said upper candy or edible part 103.

The FIG. 5 is an exploded view of another preferred embodiment, depicting each of the three individual candies or edible parts: the lowermost 501, shaped like a flat cylinder, showing on its top the upper end of its tubular holding stick 102; the intermediate 507 shaped like a little sphere, also with its tubular holding stick 508 visible on its top, and the uppermost 503, shaped like a horizontal star, with its holding stick 104.

In this figure, the three individual components are shown separated, prior to their assembling in a telescopic fashion following the sequence indicated by the assembling path lines A and B, respectively.

In this case, the intermediate tubular holding stick 508 has a portion of its lower end split in four sections, as indicated by the cut line 508a, to be bent out after the assembling.

Also in this case, the solid holding stick 104 of the uppermost candy or edible part 503 is provided with a little flap 104c, which elastically closes in during the assembling and then expands out to keep the Multiple Stacked Rotatable Lollipop assembled.

The FIG. 6 is an isometric view assembled of the possible preferred embodiment of the Multiple Stacked Rotatable Lollipop previously shown disassembled in FIG. 5, with three individual stacked components.

Its lowest component comprises a tubular outermost holding stick 102 holding the lowermost candy or edible part 501, in this case shaped like a flat cylinder, which is molded affixed around the top end of said holding stick, so that said top end of said holding stick is exposed and visible above said candy or edible part 501 as was illustrated in FIG. 5.

Above the lowest component, there is an intermediate individual candy or edible part 507, in this case shaped like a sphere, also molded wrapped around the upper portion of its tubular holding stick 508, not visible in this figure, but previously shown in FIG. 5, which is in turn inserted through the lowest and outer tubular holding stick 102 and also not visible in this figure, but has its lower end protruding out of the lower end of the tubular holding stick 102, modified with four segments 508a, bent outwardly for the user to rotate the intermediate stacked individual component independently, in relation to the lower one 501 with his/her fingers, as indicated by the arrow curved line M3.

Above said intermediate stacked individual candy or edible part 507, is stacked the uppermost candy or edible part 503, in this case shaped like a star, molded affixed on the top end of its solid holding stick 104, which in turn is inserted through the intermediate tubular holding stick 508 of the intermediate candy or edible part 507, while the lower end of said stick 104, protrudes out the lower end of the tubular holding stick 508 and is provided with a little retaining flap 104c that elastically flips out keeping in position all the Multiple Stacked Rotatable Lollipop stacked components after the assembling.

The lower portion of said solid holding stick 104 of the uppermost candy or edible part 503 protruding below provides a means for the user to rotate with his/her fingers the top stacked individual candy or edible part 503 independently in relation to the other two lower stacked individual candies or edible parts 507 and 501, respectively, as indicated by the arrow curved lines M1 and M2.

There are two main general alternate process sequences for the manufacturing of the Multiple Stacked Rotatable Lollipop. One sequence is first to manufacture each component as individual conventional lollipops and then proceed to the assembling, inserting each one into the other in a telescopic fashion, providing appropriate configuration to the protruding lower ends of the holding sticks of the intermediate and top stacked components in order to keep the group assembled together and to provide convenient means for the user to rotate any of the intermediate and the uppermost stacked components.

The other sequence is to pre-assemble first all the corresponding holding sticks inserting each one into the next below in a telescopic fashion, with the outer surfaces of the protruding lower ends of said holding sticks expanded and modified to keep all components securely assembled and providing convenient means for their manual rotation by a user, and thereafter positioning the pre-assembled group of holding sticks onto a special multi cavity mold to proceed to the pouring or injection of the different candies or edible parts mixtures filling the corresponding molding cavity of each candy or edible part around the upper end of its corresponding holding stick.

FIG. 7 depicts and isometric elevation view of an embodiment of the Multiple Stacked Rotatable Lollipop comprising three individual components stacked one above the other: the candy or edible part 501 of the lowest component, shaped in this case like a flat cylinder; that of the intermediate 507, shaped in this case like a sphere, and that of the upper one 703, shaped in this case like a truncated cone, together with their respective holding sticks 102, 508 and 104, inserted into the next below in a telescopic fashion.

The outer tubular holding stick 102 corresponds to the lowest component candy or edible part 501, and its inner diameter is slightly larger than the outer diameter of the intermediate tubular holding stick 508 of the intermediate stacked confectionary candy or edible part 507.

In this case, the manufacturing process sequence is the first one mentioned above, wherein each component is made as an individual conventional lollipop and thereafter assembled together by inserting their respective holding sticks into the other below in a telescopic fashion.

For the assembling, the intermediate tubular holding stick 508 is inserted freely into the outer tubular holding stick 102, and its lower portion protrudes out of the lower end of the outer tubular holding stick 102, providing a means for the user to amuse him/her self by manually rotating the intermediate stacked component candy or edible part 507, as indicated by the arrow curved line M3.

At the same time, in this case, the intermediate tubular holding stick 508, near its lower end, is provided with a tiny flap 508a that elastically flips out after the assembly to keep it fixed in the desired axial position.

The solid holding stick 104 of the uppermost stacked component candy or edible part 703 in turn, has a diameter slightly smaller than the inner diameter of the intermediate tubular holding stick 508, and is freely inserted into it, with the lower portion protruding at the bottom in order to provide a means for the user to rotate manually the uppermost stacked component candy or edible part 703 in relation to the other two components candies or edible parts 507 and 501, as indicated by the arrow curved lines M1 and M2.

In this embodiment, the solid holding stick 104 is also provided with a retaining element consisting in a tiny flap 104c that elastically flips out after the assembling to keep it in its axial position and in order to keep the whole Multiple Stacked Rotatable Lollipop assembled as a whole.

FIG. 8 is a magnified detail partial axial section of the lower portions assembled in a telescopic fashion of the three holding sticks 102, 508 and 104 of the embodiment depicted in FIG. 7, illustrating the way they are inserted into the next below, and the retaining flaps 508a and 104c expanded to prevent said holding sticks 508 and 104 from sliding out, thus keeping said holding sticks in their respective axial position and the Multiple Stacked Rotatable Lollipop assembled as a whole.

This figure also illustrates that substantially long portions of each holding stick 104 and 508, corresponding to the upper and intermediate stacked components candies or edible parts 703 and 507, respectively, protrude out of the lowermost one 102, in a telescopic fashion providing means for the user to grip and rotate any of said candies or edible parts stacked above in relation to the holding stick 102, corresponding to the lowermost edible part 501.

The integrated retaining means 508a and 104c can be of many different types and shapes to accomplish their purpose in different manners. Those depicted in the previous figures, are just to illustrate some of the many alternate options that can be used by anyone skilled in the fields of mechanics and confectioneries.

Figure 9:
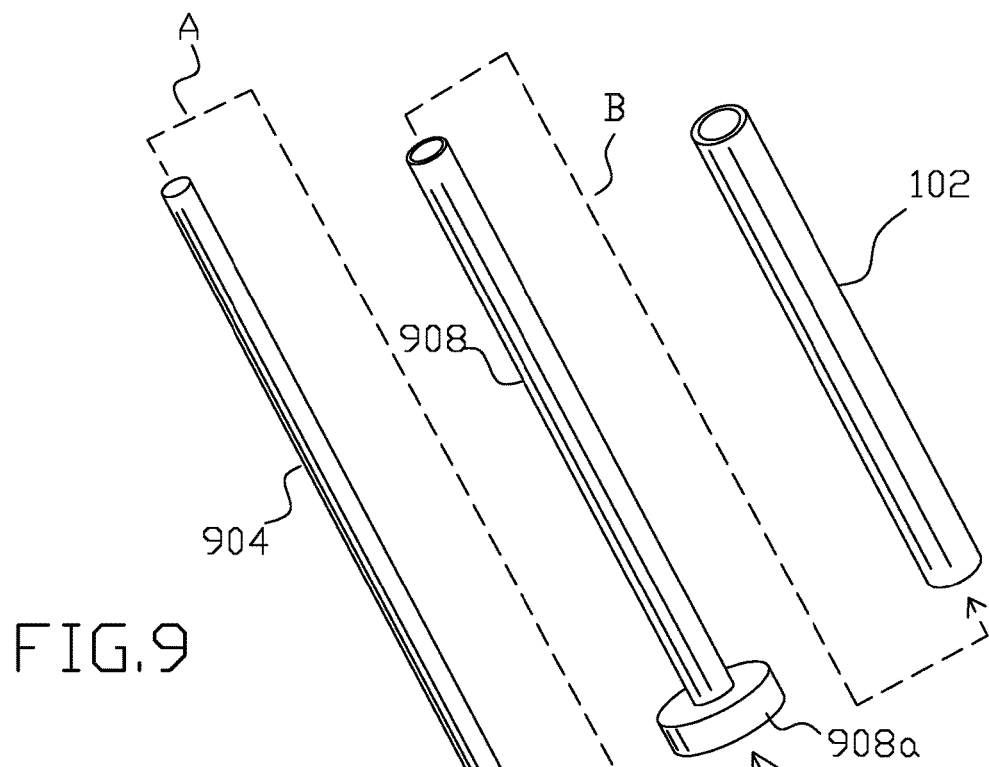
FIG. 9 is an isometric exploded view of a group of three holding sticks before assembling, being the lower end of the innermost solid holding stick and the intermediate tubular holding stick conveniently modified.

FIG. 9 depicts a group of separated holding sticks 102, 908 and 904, before being assembled following the path indicated by the assembling lines A and B. The outermost tubular holding stick 102 has its internal diameter slightly larger than the outer diameter of the next intermediate tubular holding stick 908.

Said intermediate tubular holding stick 908 in this case is provided with the outer surface of its lower end 908*a*, enlarged and shaped like a tiny flat cylindrical knob to make it easier for the user to rotate the intermediate stacked component.

The internal diameter of said intermediate holding stick 908 is slightly larger than the diameter of the solid holding stick 904, which in turn is also provided with an enlarged lower end 904*a*, in this case with the shape of a tiny spherical knob.

The purpose of the enlarged lower ends 908*a* and 904*a* is to secure assembled the group of stacked components after all the candies or edible parts of all the respective components are molded affixed around the corresponding upper sections of the holding sticks and, in addition, to provide a means for the user's amusement imparting rotation to the upper and intermediate components with his/her fingers.

Figure 10:
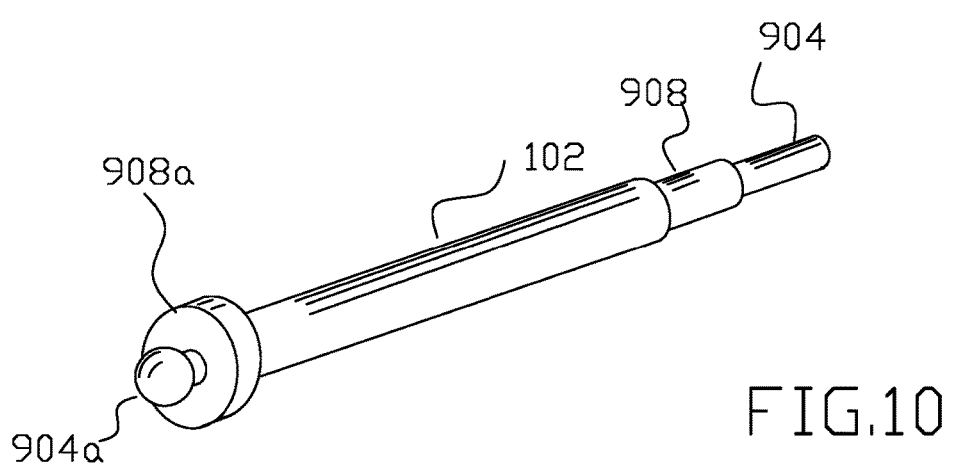
FIG. 10 is an isometric view of the same group of holding sticks depicted in FIG. 9 after having been assembled all together coaxially with each holding stick inserted into the next below in a telescopic fashion prior to the molding of their respective candies or edible parts at their upper ends.

FIG. 10 depicts the three holding sticks 904, 908 and 102, with their modified lower ends 904*a* and 908*a*, previously shown in FIG. 9, already pre-assembled each inserted into the next below in a telescopic fashion, to be conveniently positioned onto an appropriate mold or molds for the injection of the different candies or edible parts of the corresponding components, preferably in a simultaneous operation.

In the preferred embodiments of the invention illustrated in the FIGS. 5 through 10, it is possible for the user to remove and discard the holding sticks when their corresponding candies or edible parts are totally consumed, in order to facilitate the licking and sucking of the remaining ones.

Many other means, designs and decorative shapes and sizes can be used for the retaining and rotating elements, in addition to those illustrated, capable to achieve the same purposes of retaining the stacked components assembled in position and for the user to rotate manually said components in relation to the others.

The holding sticks can be made of a plurality of appropriate materials and also provided with many different shapes, colors and sizes.

In the same way, like in any conventional lollipop, a plurality of shapes, flavors and colors can be used for each of the candies or edible parts of the Multiple Stacked Rotatable Lollipop object of the present invention.

The individual components of the present invention are similar or very similar to conventional lollipops, thereof their manufacturing processes are well known.

In general, in order to reduce the negative health impact typical of high caloric candies, the candies or edible parts of the present invention must have preferably a small total mass and volume, with no high caloric sugar added.

If necessary to improve the sweet taste of the candies or edible parts of the present invention, while still reducing said negative health impact, it would be preferably the use of low caloric natural and healthy sweeteners like those containing "Rebaudioside A", approved by the FDA to be used in food manufacturing and that is derived from the plant "stevia".

All the above figures depict embodiments with the holding sticks located in substantially centered position, but it is also possible to locate said holding sticks at significant distance from the center of mass of the candies or edible parts, especially of those upper and intermediate stacked components and make them rotate when the Multiple Stacked Rotatable Lollipop is manually moved in a circular fashion.

In addition, if the Multiple Stacked Rotatable Lollipop of the present invention is not provided with any retaining element at all, or if said retaining elements are reversible, the user has the option to disassemble it at will to consume each confectionery component like an individual conventional lollipop.

Although the modifications of the holding sticks, and the assembling process of the Multiple Stacked Rotatable Lollipop invention may require operations that are not usually used for the manufacturing of conventional individual lollipops, said operations are either simple or similar to other industrial manufacturing processes, such as, for example, the manufacturing of drinking straws, plastic stirrers, and many other products.

The main novel feature of this invention is that the user can impart the rotating motion to each of the individual components of the present invention either with his/her fingers outside of his/her mouth by means of their holding sticks, thus improving his/her amusement watching the rotating colored components or with his/her tongue directly touching their edible parts.

While all of the fundamental characteristics and features of the invention have been shown and described herein, with reference to particular embodiments thereof, a latitude of modifications, various changes and substitutions are intended in the foregoing disclosure and it will be apparent that in some instances, some features of the invention may be employed without a corresponding use of other features without departing from the scope of the invention.

It should be also understood that various substitutions, modifications and variations may be made by those skilled in the art without departing from the spirit or scope of the invention.

Consequently all such modifications, variations and substitutions are included within the scope of the invention as defined by the following claims.

What is claimed:

1. A multiple stacked rotatable lollipop comprising at least two individual components: an upper component stacked above a lower component, each in turn comprising an edible part attached to the upper end of a holding stick wherein:

the holding stick of the lower component is tubular, and said edible part of said lower component is molded and affixed around the upper portion of said tubular holding stick, leaving the upper open end of said tubular holding stick visible and accessible at the top of said edible part of said lower component;

the holding stick of the upper component is solid and said edible part of said upper component is molded and affixed around the upper portion of said solid holding stick, completely covering the top portion of said holding stick;

the internal diameter of said tubular holding stick of said lower component is slightly larger than the diameter of said solid holding stick of said upper component, said solid holding stick of said upper component is inserted through said tubular holding stick of said lower component, wherein each of said individual components are free to rotate coaxially in relation to the other;

said holding stick of said upper component is substantially longer than said tubular holding stick of said lower component, thereof after the assembly of the multiple stacked rotatable lollipop a lower end portion of said solid holding stick of said upper component is protruding out of the lower end of said tubular holding stick of said lower component, after the assembly of the multiple stacked rotatable lollipop, said tubular holding stick of said lower component performs as the outer holding stick of the multiple stacked rotatable lollipop and said solid holding stick of said upper component performs as the inner holding stick of the multiple stacked rotatable lollipop, further comprising at least one intermediate stacked component with an edible part affixed around the upper portion of a tubular holding stick with the upper end open visible and accessible on top of said edible part, wherein said tubular holding stick of said intermediate component has an outer diameter slightly smaller and a length substantially longer than the inner diameter and the length, respectively, of said outer tubular holding stick of said lower component and, said inner solid holding stick of said upper component of the multiple stacked rotatable lollipop is provided with a diameter slightly smaller than the inner diameter of said tubular holding stick of said intermediate component and is substantially longer than the intermediate holding stick, wherein said intermediate component fits stacked and loosely inserted in a telescopic fashion between said lower and upper components with the lower end portion of said tubular holding stick of said intermediate stacked component substantially protruding out of the lower end of said outer tubular holding stick of said lower component and, the lower end portion of said inner solid holding stick of said upper component substantially protrudes out of the lower end of said tubular holding stick of said intermediate component after the assembly of the multiple stacked rotatable lollipop.

2. The multiple stacked rotatable lollipop as set forth in claim 1, wherein the lower end portion of said solid inner holding stick of said upper component protruding out of the lower end of said tubular outer holding stick of said lower component is provided with a retaining element, in order to keep all of said individual components assembled as a whole, thereby preventing the undesired separation of all of said individual components of the multiple stacked rotatable lollipop.

3. The multiple stacked rotatable lollipop as set forth in claim 2, wherein said solid holding stick of said upper component is inserted through said tubular holding stick of said lower component and said retaining element bends outwardly from said protruding lower end of said solid inner holding stick, preventing the undesired disassembling of all of said individual components of the multiple stacked rotatable lollipop.

4. The multiple stacked rotatable lollipop as set forth in claim 2, wherein said retaining element consists of an elastic little flap at the protruding lower portion of said solid inner holding stick with a free edge pointing upward, which collapses inwardly to facilitate the assembly and expands outwardly after the assembly is completed, thereby preventing the undesired disassembling of all of said individual components of the multiple stacked rotatable lollipop.

5. The multiple stacked rotatable lollipop as set forth in claim 1, wherein each of said holding sticks of said individual components are located offset from the center of mass of said edible parts of said individual components.

6. The multiple stacked rotatable lollipop as set forth in claim 1, wherein said holding sticks of all of said individual components are made of a plurality of materials and are provided with a plurality of sizes, colors and configurations.

7. The multiple stacked rotatable lollipop as set forth in claim 1, wherein said edible parts of said individual components are provided with a plurality of shapes, sizes, colors and flavors.

8. The multiple stacked rotatable lollipop as set forth in claim 1, wherein said edible parts of said individual components are made with low caloric natural purified sweeteners approved by the FDA.

9. The multiple stacked rotatable lollipop as set forth in claim 8, wherein said low caloric natural purified sweeteners approved by the FDA contain Rebaudioside A.

10. The multiple stacked rotatable lollipop as set forth in claim 1, wherein the assembly is reversible for a user disassemble the multiple stacked rotatable lollipop.

* * * * *